(12) United States Patent
Peil et al.

(10) Patent No.: US 10,324,232 B2
(45) Date of Patent: Jun. 18, 2019

(54) METHOD FOR PRODUCING AN OPTICAL MODULE HAVING A POLYMER OPTICAL SYSTEM

(71) Applicant: Heraeus Noblelight GmbH, Hanau (DE)

(72) Inventors: Michael Peil, Otzberg (DE); Susanne Schadt, Langenselbold (DE); Harald Maiweg, Korschenbroich (DE); Marcus Helmling, Bad König (DE)

(73) Assignee: Heraeus Noblelight GmbH, Hanau (DE)

( * ) Notice: Subject to any disclaimer, the term of this patent is extended or adjusted under 35 U.S.C. 154(b) by 11 days.

(21) Appl. No.: 14/397,984

(22) PCT Filed: Mar. 21, 2013

(86) PCT No.: PCT/EP2013/000863
§ 371 (c)(1),
(2) Date: Oct. 30, 2014

(87) PCT Pub. No.: WO2013/164055
PCT Pub. Date: Nov. 7, 2013

(65) Prior Publication Data
US 2015/0110970 A1   Apr. 23, 2015

(30) Foreign Application Priority Data
May 2, 2012   (DE) .................. 10 2012 008 640

(51) Int. Cl.
*B29C 71/02*   (2006.01)
*G02B 1/00*    (2006.01)
(Continued)

(52) U.S. Cl.
CPC .............. *G02B 1/00* (2013.01); *B29C 39/025* (2013.01); *B29C 39/123* (2013.01); *B29C 41/20* (2013.01);
(Continued)

(58) Field of Classification Search
CPC ......... G02B 1/00; G02B 3/0031; H01L 33/54; H01L 21/56; B29C 33/0055; B29C 39/26
See application file for complete search history.

(56) References Cited

U.S. PATENT DOCUMENTS 4,235,654 A     11/1980   Dohi et al.
5,380,555 A *    1/1995   Mine ...................... C04B 41/009
                                              257/E21.271
(Continued)

FOREIGN PATENT DOCUMENTS

DE   102010001079 A1   7/2010
DE   102009013134 A1   9/2010
(Continued)

OTHER PUBLICATIONS

Int'l Search Report and Written Opinion dated Aug. 6, 2013 in Int'l Application No. PCT/EP2013/000863.
(Continued)

*Primary Examiner* — Michael P Wieczorek
(74) *Attorney, Agent, or Firm* — Panitch Schwarze Belisario & Nadel LLP

(57) ABSTRACT

A method is provided for production of a module, including the steps of: providing a substrate (1) having a first surface (5) in the form of a translucent carrier; providing an open casting mold (6), wherein the formation of at least one optical element (4, 4') is provided in the casting mold (6); covering the surface (5) with a polymeric casting compound (3) in the open casting mold, while forming the optical element from the casting compound (3); and curing the
(Continued)

casting compound in the casting mold, wherein the translucent carrier and the casting compound (3) together form an optical system (10).

13 Claims, 3 Drawing Sheets

(51) Int. Cl.
| | |
|---|---|
| B29C 41/20 | (2006.01) |
| B29D 11/00 | (2006.01) |
| G02B 3/00 | (2006.01) |
| B29C 39/02 | (2006.01) |
| B29C 39/12 | (2006.01) |
| B41M 7/00 | (2006.01) |
| G02B 3/08 | (2006.01) |
| G02B 5/04 | (2006.01) |
| B29K 105/00 | (2006.01) |
| B29K 83/00 | (2006.01) |
| B29L 9/00 | (2006.01) |
| B29L 11/00 | (2006.01) |

(52) U.S. Cl.
CPC ..... *B29D 11/00298* (2013.01); *B41M 7/0081* (2013.01); *G02B 3/00* (2013.01); *G02B 3/0031* (2013.01); *G02B 3/08* (2013.01); *G02B 5/04* (2013.01); *B29K 2083/00* (2013.01); *B29K 2083/005* (2013.01); *B29K 2105/0014* (2013.01); *B29K 2995/0029* (2013.01); *B29K 2995/0055* (2013.01); *B29L 2009/005* (2013.01); *B29L 2011/00* (2013.01)

(56) References Cited

U.S. PATENT DOCUMENTS

| | | | | |
|---|---|---|---|---|
| 7,295,375 | B2 * | 11/2007 | Jacobowitz | B29D 11/00365 359/619 |
| 7,682,531 | B2 * | 3/2010 | Kadota | B29D 11/00009 264/1.1 |
| 8,956,922 | B2 * | 2/2015 | Peil | F21K 9/00 438/127 |
| 2002/0064666 | A1 * | 5/2002 | Shinmo | B29C 33/424 428/447 |
| 2006/0208374 | A1 | 9/2006 | Shimotsuma et al. | |
| 2008/0193749 | A1 * | 8/2008 | Thompson | B29D 11/0073 428/343 |
| 2008/0203413 | A1 * | 8/2008 | Schrank | H01L 33/52 257/98 |
| 2011/0204531 | A1 | 8/2011 | Hara et al. | |
| 2012/0100344 | A1 | 4/2012 | Kobayashi | |

FOREIGN PATENT DOCUMENTS

| | | |
|---|---|---|
| EP | 0404111 A2 | 12/1990 |
| EP | 1142682 A1 | 10/2001 |
| EP | 2189823 A1 | 5/2010 |
| GB | 582248 A | 11/1946 |
| JP | S546006 A | 1/1979 |
| JP | H 09223941 A | 8/1997 |
| JP | 2001269331 A | 10/2001 |
| JP | 2002068782 A | 3/2002 |
| JP | 2006231917 A | 9/2006 |
| JP | 2007110122 A | 4/2007 |
| JP | 2009109579 A | 5/2009 |
| JP | 2009192776 A | 8/2009 |
| JP | 2010052847 A | 3/2010 |
| JP | 2011119086 A | 6/2011 |
| JP | 2011137896 A | 7/2011 |
| WO | 9208998 A1 | 5/1992 |
| WO | 2004054773 A1 | 7/2004 |
| WO | 2005036221 A1 | 4/2005 |
| WO | 2012031703 A1 | 3/2012 |
| WO | WO 2012031703 A1 * | 3/2012 ............... F21K 9/00 |

OTHER PUBLICATIONS

Office Action dated Sep. 20, 2016 in CA Application No. 2,872,078.
Office Action dated Oct. 11, 2016 in JP Application No. 2015-509320 (English Translation only).
Office Action dated Apr. 26, 2013 in DE App 10 2012 008 640.7 (with partial English translation).
Office Action dated Oct. 11, 2016 in JP Application No. 2015-509320 (with partial English translation).
German translation of Office Action (with English Search Report) dated Dec. 24, 2015 in CN Application No. 201380022924.5.
Office Action dated May 1, 2017 in CA Application No. 2,872,078.
Office Action and Search Report (with English translation of Search Report) dated Aug. 24, 2015 in TW Application No. 102113844.
Office Action dated Dec. 14, 2017 in CA Application No. 2,872,078.
Office Action dated Aug. 7, 2018 in IN Application No. 7937/CHENP/2014.

* cited by examiner

METHOD FOR PRODUCING AN OPTICAL MODULE HAVING A POLYMER OPTICAL SYSTEM

CROSS-REFERENCE TO RELATED APPLICATIONS

This application is a Section 371 of International Application No. PCT/EP2013/000863, filed Mar. 21, 2013, which was published in the German language on Nov. 7, 2013, under International Publication No. WO 2013/164055 A1 and the disclosure of which is incorporated herein by reference.

BACKGROUND OF THE INVENTION

The invention relates to a method for producing an optical module comprising covering a first surface of a substrate with a polymeric casting compound in an open casting mold. The invention also relates to an optical module comprising a substrate having a first surface and a layer of polymeric casting compound applied onto the first surface, wherein an optical element is provided in the layer of polymeric casting compound by an open casting method.

International Publication No. WO 2012/031703 A1 describes a production method for chip-on-board modules, in which a substrate comprises a plate-shaped carrier having multiple LEDs, wherein a surface of the substrate is provided, in an open casting mold, with a cover made up of a layer for providing an optical system.

BRIEF SUMMARY OF THE INVENTION

It is an object of the invention to devise a method for producing an optical module with a broad range of applications.

The object is met by a method for producing an optical module, comprising the steps of:

(a) providing a substrate having a first surface in the form of a translucent carrier;

(b) providing an open casting mold, wherein the formation of at least one optical element is provided in the casting mold;

(c) covering the surface with a polymeric casting compound in the open casting mold while forming the optical element from the casting compound; and (d) curing the casting compound in the casting mold, whereby the translucent carrier and the casting compound together form an optical system.

An optical system according to the invention can be manufactured easily from materials that are adapted to the existing requirements. In an optical system of this type, the carrier can, in principle, consist of the same or of a different material as or than the layer applied to it. The carrier preferably consists of a glass, for example. This can be, in particular, UV-translucent glass, for example quartz glass.

A polymeric casting compound in the scope of the invention can be any suitable polymer that is transparent over a desired range of wavelengths, for example silicone, PMMA, polycarbonate, or the like.

In the scope of the invention, "an optical element" shall be understood to mean any formation in the layer that permits for well-defined transmission of light including in the UV range and/or IR range, depending on the requirements. Preferred embodiments can have the optical element be a lens, for example a collecting lens, dispersing lens, cylinder lens, Fresnel lens, or the like. In other embodiments, the optical element can just as well consist of light scattering, diffraction by a prism or the like. The formation of plane-parallel surfaces for simple transmission of light is an optical system according to the scope of the invention. The polymeric layer with the optical element formed therein forms an optical system that is arranged right on the substrate.

The substrate in the casting mold can be covered in a variety of ways. Either the casting compound can be added to the casting mold first, followed by the substrate being immersed into the casting compound. Alternatively, the substrate can first be inserted into the at least partly empty casting mold, followed by adding the casting compound in a manner. In either case, the casting mold contains preferred structures such as fins, lugs or the like, on which the substrate is supported and positioned.

In a preferred exemplary embodiment, the casting compound contains no admixture of adhesion promoter. This allows for easy release from the casting mold, wherein it can be feasible in appropriate cases to also forego the use of release film. At least with some casting compounds, for example silicones, especially good UV translucence can be attained as well.

Preferably, the casting compound can contain a catalyst for initiation of a curing process. This may concern, for example, very small admixtures of platinum or similar substances. The catalytically-induced curing allows high purity of the casting compound to be attained. It is particularly preferred for the casting compound to not be cured by UV light, since high translucence for UV light is especially desired in many cases.

Moreover, the method preferably comprises the step of heating the casting compound in the casting mold to a defined temperature in order to initiate and/or accelerate a curing process. Catalytically-induced curing, for example, can be accelerated by heating, which renders the method more effective and reduces even further the amount of catalyst required. However, curing processes that proceed just by elevated temperature are conceivable just as well. Typical defined temperatures are below ranges in which embrittlement or other degeneration of the casting compound is to be expected. If the casting compound is a silicone, exemplary temperature ranges are at approx. 100° C., preferably less than 140° C. The defined temperature depends on which temperatures are compatible with the substrate, among other factors.

In a preferred embodiment, the invention provides the step of coating the first surface with an adhesion promoter before covering it with the polymeric casting compound. Applying an adhesion promoter onto the surface of the substrate to be coated allows the admixture of additives to the casting compound in the casting mold to be avoided or reduced. Moreover, a broader range of casting compound is available for coating. Another advantageous effect is the good release of the cured casting compound from the casting mold. In particular, the casting mold does not need to be coated or lined with release film by this means in the present case.

In order to minimize adverse effects at the transition from substrate to silicone, it is preferred to provide the adhesion promoter to be applied onto the surface with the applied layer having a mean thickness of less than 100 nm. In this context, it is desirable for the optical properties that the thickness of the layer of adhesion promoter is less than half the wavelength of the light passing through the optical element. More preferably, the thickness of the layer is less than 10 nm, in particular no more than 10 monolayers. Due to the function of the adhesion promoter, the application of just a monolayer is ideal and desired.

The adhesion promoter can be applied to the substrate in a suitable manner, for example by immersion, vapor deposition, application of droplets, spraying, or by spin coating. It is particularly preferred to thin the applied layer after application, for example by blowing off excessive amounts of adhesion promoter.

Preferably, the adhesion promoter itself is UV-resistant. Degeneration of the adhesion promoter through UV radiation can be tolerated at least if the layer is sufficiently thin. Adhesion promoters for casting compounds are generally known and depend on the substrate to be used. Adhesion promoters are often molecules possessing a first terminal group that binds to the substrate and a second terminal group that binds to the casting compound. The adhesion promoter preferably is an adhesion promoter that binds to the casting compound by chemical bonds. The adhesion promoter may bind to the substrate by chemical and/or physical bonds, for example through adhesion or Van-der-Waals forces, depending on the existing circumstances. If the casting compound is, for example, a silicone, typical adhesion promoters consist, for example, of a mixture of reactive siloxanes and silicon resins. In particular, the terminal groups can be optimized to suit the substrate.

For optimization of the open casting method, the invention provides the viscosity of the casting compound before curing to be less than 1,000 mPa·s. Preferably, the viscosity is less than 100 mPa·s, particularly preferably less than 50 mPa·s. The above-mentioned low viscosities allow the casting mold to be filled rapidly and without producing bubbles, and allow, in particular, the substrate to be covered without producing bubbles. In this context, any excess of casting compound, displaced by the substrate being immersed, can flow off easily at an overflow.

It is generally advantageous for the invention to provide the cured casting compound to possess a hardness in the range of 10 to 90 Shore A. It is particularly preferred for the hardness to be in the range of 50 to 75 Shore A. This provides for sufficient mechanical stability to ensure exact shaping, even of a sophisticated optical system. Moreover, the high elasticity of the coating provides very good protection from mechanical impacts such as shocks, vibrations or thermally-induced mechanical tension.

A generally preferred embodiment provides the optical element consisting of the casting compound to possess long-lasting UV resistance for irradiation intensities in excess of 1 W/cm$^2$ in the wavelength range below 400 nm. It is particularly preferred for the resistance to be evident also with respect to irradiation intensities in excess of 10 W/cm$^2$. It has been evident that highly pure silicone, in particular, is a very good material for use with UV radiation. In this context, "long-lasting resistance" shall be understood to mean that the radiation exposure can be for a long period of time of at least several months without marked degeneration or color-change and/or yellowing of the silicone. The preferred UV resistance of a module according to the invention is therefore significantly higher than the common UV resistance of materials with respect to sunlight of an estimated approx. 0.15 W/cm$^2$.

In a generally preferred embodiment, the invention provides the polymeric casting compound to consist, at least predominantly, of a silicone. Silicones offer good properties for effective processing in an open casting mold, for example with respect to viscosity, reactivity, adhesion, etc.

A preferred refinement provides the silicone as a mixture of at least two silicones right before placing it in the casting mold. Such two- or multi-component systems are commercially available, wherein mixing two, in particular, highly pure silicones in turn produce highly pure silicone, again with the mixing initiating a curing process and/or a cross-linking process. Accordingly, one of the silicones can be designed, for example, such that it contains a catalyst for curing the mixture, which can by itself not cross-link the silicone.

It is generally advantageous for the silicone to be highly pure and to contain less than 100 ppm of foreign substances. It is particularly preferred for the foreign substance content to be less than 10 ppm. The term "foreign substances" shall be understood to mean all organic or other admixtures, except for the catalyst, that are not part of the cross-linked, cured silicone system itself. Admixed adhesion promoters are an example of undesired foreign substances. In general, components comprising carbon chain bonds are also considered to be undesired foreign substances. Bonds of this type are usually not UV-resistant. A silicone that is desired according to the invention therefore comprises, at least after curing, no more than single carbon atoms, for example in the form of methyl residue groups. The high purity of the silicone allows, in particular, especially high UV resistance to be attained. This applies not only to the mechanical resistance of the silicone, but also to an optical durability, since even the presence of minor impurities is associated with premature yellowing of the UV-exposed silicone.

Depending on the individual design, optical modules according to the invention can transmit high radiation intensities, in particular in the UV range or IR range. They can preferably be used for producing lamps that focus high irradiation densities into a defined structure. A particularly preferred use is the production of a device for drying coatings. Devices of this type can be used for the drying of lacquers in printing procedures, in particular in offset printing procedures.

Another preferred embodiment provides, in addition, a second surface to be coated after step d, wherein the coating of the second surface also comprises procedural steps (a) to (d). Accordingly, for example an optical system having two sides of layers formed to be the same or different, can be produced on the central carrier, for example a glass plate.

In this context, the second surface can either be a second surface of the substrate, for example in the case of coating, a side of the substrate that is opposite to the first coating, or any other surface. In particular, this can concern an external surface of the first coating onto which a second coating is applied by repeating the application of the method according to the invention. Depending on the existing requirements, the second layer can be applied right onto the first layer. Alternatively, the second surface can just as well belong to an intermediate layer, such as a coat, deposited metal, etc., that is first applied to the first coating, for example.

The object of the invention is also met by an optical module, comprising a substrate having a first surface and a layer of a polymeric casting compound applied onto the first surface, wherein an optical element is provided in the layer of casting compound by an open casting method, wherein the substrate is provided in the form of a translucent carrier, which, together with the layer, forms an optical system.

Preferably, an optical module according to the invention also comprises one or more features according to the description and claims herein. In this context, it is particularly preferred for the polymeric casting compound to consist of a silicone, in particular one having more one of the preferred features described above. The optical module can be produced, in particular, according to a method according to the invention. But, in principle, the optical module can just as well be produced by a different method.

The object of the invention is also met by a lamp comprising an optical module according to the invention. According to the invention, a lamp of this type is preferably used for drying a layer. This can preferably concern the use in a printing procedure.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
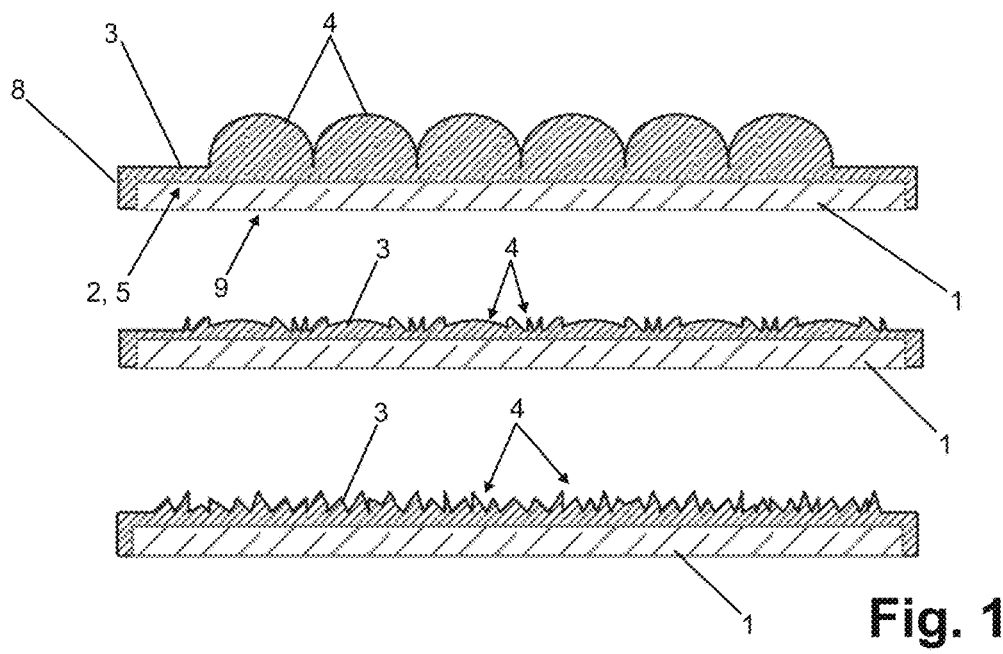
FIG. 1 is a series of schematic, sectional views of three variants of an optical module according to embodiments of the invention.

An optical module according to FIG. 1 comprises a substrate 1 onto which a layer of an adhesion promoter 2 has been applied. A shaped layer 3 of a polymeric casting compound has been applied onto the adhesion promoter 2 and comprises, in the present case, a plurality of optical elements 4 in the form of collecting lenses. Silicone is the casting compound in each of the exemplary embodiments described in the following. In general, though, other polymeric casting compounds are suitable just as well.

In this context, the substrate consists of a translucent carrier 1, a glass plate in the present case. The carrier 1 and one or more silicone layers 3, 3' (see FIG. 4, FIG. 5), which have been applied analogously to the first example and have optical elements 4, 4' provided therein, jointly form an optical system 10. In the present case, the substrates and/or translucent carriers 1 each are shown as plates having plane-parallel surfaces. Depending on the existing requirements, the carrier can just as well comprise optical elements, such as lenses.

In the example on the top according to FIG. 1, the optical elements 4 are provided as collecting lenses.

In the example in the middle according to FIG. 1, the optical elements 4 are provided as Fresnel lenses.

In the example on the bottom according to FIG. 1, the optical element 4 is provided as a quasi-random collection of light-diffracting structures and/or formations by which a scattering effect is attained.

The layers 3, 3' each consist of a highly pure silicone having a hardness of approx. 65 Shore A. The silicone is colorless and transparent. The silicone is highly translucent in the wavelength range from approx. 300 nm to approx. 1,000 nm. The silicone is UV-resistant to long-lasting irradiation with wavelengths below 400 nm and an energy density in excess of 10 Watt/cm$^2$.

Each of the optical modules described above is produced according to the following method:

First, an open casting mold 6 (see FIG. 2) is provided that contains the negative molds of the formations for the optical elements 4. Moreover, supports 6a in the form of fins or lugs supporting the substrate 1 in a certain position are provided in the mold 6.

Then, the surface 5 of the substrate 1 to be coated is coated with an adhesion promoter 2, possibly after a cleaning step. The coating then proceeds, for example, by applying droplets of the substance and blowing-off any excess of the substance, which also dries the remaining adhesion promoter. In the ideal case, the thickness of the adhesion promoter applied is equal to just one monolayer, in any case it is preferred to be less than 100 nm.

As soon as the substrate is prepared as described, a silicone mixture of two components is produced and placed in the open casting mold. One of the components contains a catalyst and the other component contains a cross-linker. The mixture has a viscosity of less than 50 mPa·s in the present case. As a matter of principle, mixing the components initiates the curing process, though this process proceeds quite slowly at low temperatures such as room temperature.

Subsequently, the substrate is placed in the casting mold in a controlled manner, with the coated surface 5 facing downwards and immersed into the silicone mixture (see left side of FIG. 2).

Figure 3:
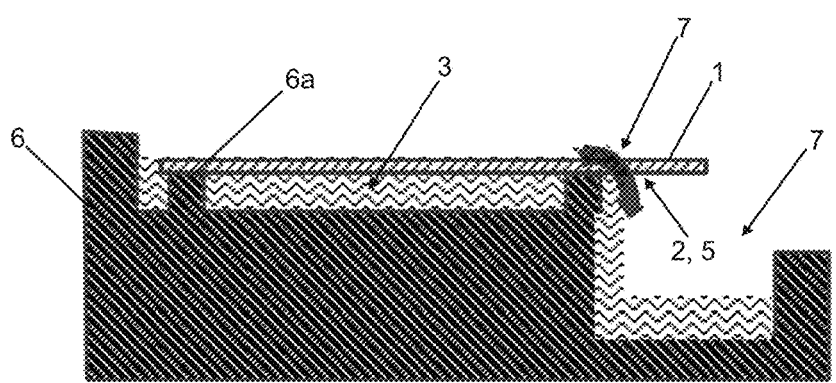
FIG. 3 is a schematic, sectional view of a variant of the casting mold from FIG. 2.

In particular, an overflow 7 can be provided on the casting mold in this context, as shown schematically in FIG. 3. The overflow and the low viscosity of the silicone jointly ensure that the depth of immersion of the substrate is well-defined and, in particular, that any silicone displaced by the substrate can flow off. By this means, it can be ensured, if necessary, that not only the surface 5 of the substrate, but also the front sides of the substrate get covered by a circumferential rim 8 of layer 3, whereas a back side 9 of the substrate is not being coated. Complete enveloping of the substrate may be desirable in other embodiments, though.

The rim 8 has not only a protective function for the carrier substrate 1, if the same is supported on its rim or upon a number of the modules being arranged edge to edge, but it also enables direct, gap-less, transparent arrangement of the substrates and thus minimization of the deviation of light at the optical boundaries between two carrier substrates.

Once the substrate is positioned on the supports 6a, it is checked, if necessary, whether the surface 5 is wetted completely and, in particular, without forming bubbles. In a possible refinement of the invention, the immersion of the substrate can just as well proceed in a vacuum in order to prevent the air bubble issue. However, due to the viscosity being low, bubble-free coating can generally be attained in the absence of a vacuum as well.

After the positioning, the silicone is cured and/or cross-linked. This is accelerated significantly in expedient manner by increasing the temperature. Typically, curing can be completed in half an hour at a temperature of approx. 100° C. At temperatures in the range of 150° C., curing can typically be completed in just a few minutes. The selection of the temperature for this thermal curing process must also take into consideration the properties of the respective substrate.

Figure 2:
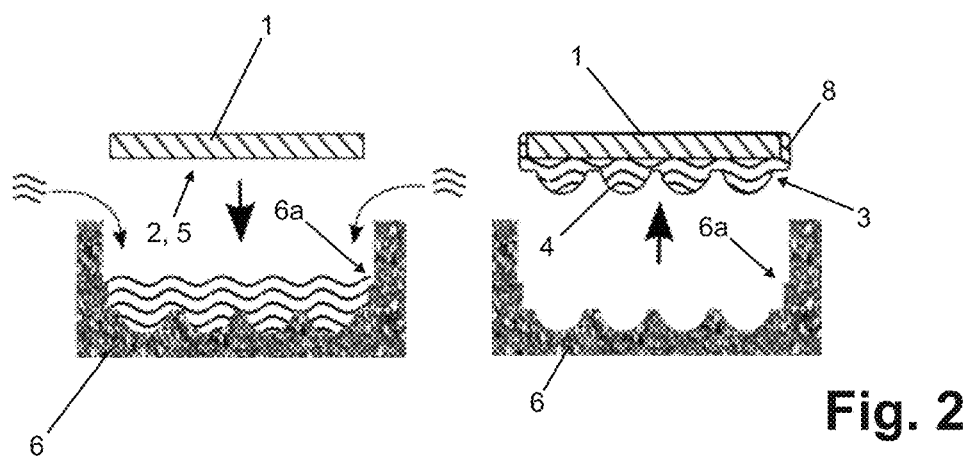
FIG. 2 is two schematic, sectional views of an open casting mold and a substrate during the production of an optical module according to an embodiment of the invention.

Once the silicone is cured, the substrate, now coated, can be taken out of the re-usable casting mold as shown on the right side in FIG. 2.

Since highly pure silicone without any admixture of adhesion promoter in the silicone is used in the present case, no further measures aimed at releasing the silicone 3 from the mold 6 are required. In particular, the casting mold is not being lined with a release film or the like. This simplifies the production and enables very exact reproduction of the structures of the casting mold.

Figure 4:
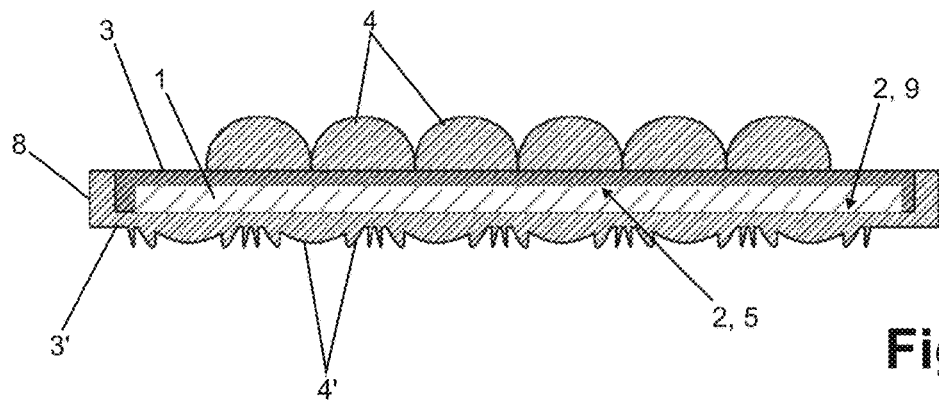
FIG. 4 is a schematic, sectional view of a first refinement of a module according to FIG. 1.
Figure 5:
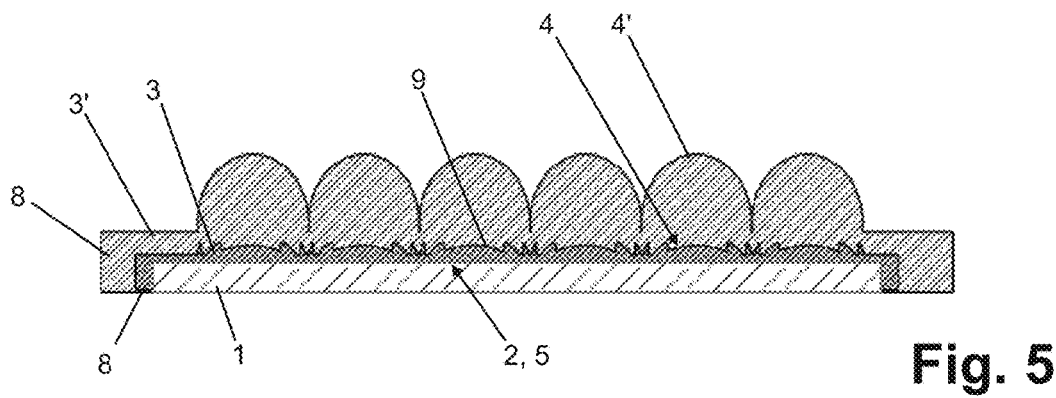
FIG. 5 is a schematic, sectional view of a second refinement of a module according to FIG. 1.

The method described above can be applied repeatedly to the same object, if required. FIG. 4 and FIG. 5 show embodiments of the invention, which each show such refinements of examples from FIG. 4. In each case, after producing a first layer 3 having optical elements 4, a second layer 3' having optical elements 4' was produced.

In the case of the example according to FIG. 4, the second layer 3' was applied onto the back side and/or opposite sides of the substrate 1, which is provided as a planar plate in the present case. For this purpose, the substrate simply needs to be provided with an adhesion promoter 2 on the yet uncoated side 9 and then inserted forward in a corresponding casting mold 6. The further procedural steps correspond to the procedure described above.

In the example shown in FIG. 4, the first surface 5, which is the front side of the substrate 1, has been coated with a plurality of collecting lenses 4, for purposes of illustration. The second surface 9, which is the back side of the substrate 1, has been coated with Fresnel lenses 4', which each are aligned with the collecting lenses 4.

In the example shown in FIG. 5, first, a layer 3 having Fresnel lenses in the present case, was applied to the first surface 5, which is the front side of the substrate. Subsequently, an adhesion promoter 2 was applied onto the layer 3 and a second layer 3' having collecting lenses 4' was then applied onto the first layer 3. In this case, the first layer 3 applied is the substrate according to the scope of the invention and its external surface is the second surface 9.

As a matter of principle, the number and design of such multiple layers are not limited in any way.

The layers can just as well differ in composition of the casting material, in particular can be different casting materials and/or admixtures to the casting materials. Accordingly, different properties thus can be combined, or the optical properties obtained by application of many layers can be influenced nearly gradually, e.g. by slightly changing the refractive index of the casting material used. Likewise, the final current boundary layer can be influenced and changed before applying the next layer, e.g. by silanizing a silicone boundary layer, dielectric or metallic coating by sputtering, spraying, wetting, or any other customary surface coating procedures.

The use of particularly pure silicone is specified above as being preferred in order to optimize high degrees of transmission and material resistance in critical wavelength ranges. As a matter of principle, the casting material can be filled with optically effective materials in order to thus generate further optical functionalities, such as conversion of the wavelength of light by introducing phosphorescent and fluorescent substances, such as rare earth elements, or for affecting the opacity of the optical system by introducing scattering substances, such as transparent or translucent particles (e.g., made of glass or ceramic materials) or metallic particles.

Figure 6:
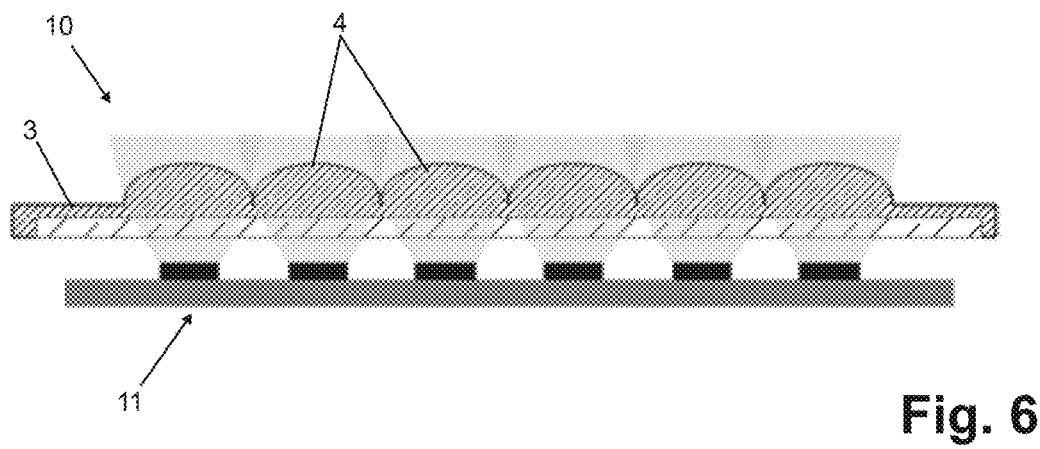
FIG. 6 is a schematic, sectional view of an example of a use of a module according to FIG. 1.

FIG. 6 shows a preferred use of an optical system 10, as described above, in combination with a two-dimensional light source. The light source is provided in this case as LED module 11 having a number of LEDs arranged in an array. The optical system is situated at a distance in front of the light source and refracts the light of the individual LEDs in a desired manner, by collecting lenses that are each assigned to one LED.

Figure 7:
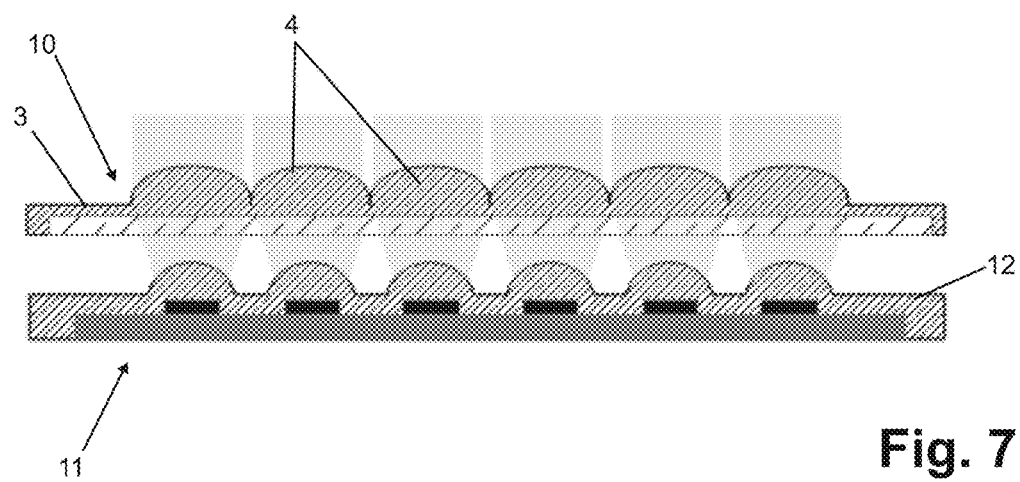
FIG. 7 is a schematic, sectional view of an example of a combined use of various exemplary embodiments of the invention.

FIG. 7 shows another preferred use, in which an LED module 11 is combined with a module according to the embodiment of the invention according to FIG. 1. In this context, the LED module 11 is provided to have a primary optical system 12. An optical module that is provided as optical system 10 is arranged upstream of the first optical module. Preferably, both modules comprise multiple collecting lenses, each correlated to the LEDs, which act in concert to transport a large opening angle of the LEDs.

The LED module 11 having the primary optical system 12 can be manufactured, for example, according to the teaching of WO 2012/031703 A1.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing an optical module comprising the following steps:
   (a) providing a translucent carrier having a first surface;
   (b) providing an open casting mold, wherein a molding for at least one optical element is formed in the open casting mold, the open casting mold including supports for supporting the translucent carrier and an overflow region;
   (c) coating the first surface with an adhesion promoter, the adhesion promoter comprising a mixture of reactive siloxanes and silicon resins;
   (d) after the first surface is coated with the adhesion promoter, positioning the translucent carrier on the supports and covering the first surface with a polymeric casting compound in the open casting mold while forming the at least one optical element from the polymeric casting compound, such that excess polymeric casting compound displaced by the translucent carrier flows into the overflow region, the polymeric casting compound comprising at least predominantly a silicone; and
   (e) curing the casting compound in the casting mold, wherein the translucent carrier and the at least one optical element together form an optical system.

2. The method according to claim 1, wherein the polymeric casting compound contains no admixture of adhesion promoter.

3. The method according to claim 1, wherein the polymeric casting compound contains a catalyst for initiation of a curing process.

4. The method according to claim 1, further comprising the following step:
   heating the polymeric casting compound in the casting mold to a defined temperature to initiate and/or accelerate the curing step.

5. The method according to claim 1, wherein the adhesion promoter is applied onto the first surface as a layer having a mean thickness of less than 100 nm.

6. The method according to claim 1, wherein the polymeric casting compound has a viscosity before curing of less than 1,000 mPa·s.

7. The method according to claim 1, wherein the cured casting compound possesses a hardness in a range of 10 to 90 Shore A.

8. The method according to claim 1, wherein the at least one optical element formed from the polymeric casting compound possesses a UV resistance for irradiation intensities in excess of 1 W/cm$^2$ in a wavelength range below 400 nm.

9. The method according to claim 1, wherein the silicone is provided as a mixture of at least two silicones right before placing it into the casting mold.

10. The method according to claim 1, wherein the silicone contains less than 100 ppm of foreign substances.

11. The method according to claim 1, further comprising the following step:
   coating a second surface after step (e), wherein the coating of the second surface also comprises procedural steps (a) to (e).

12. The method according to claim 1, wherein the open casting mold is reusable, the method further comprising the following steps:
   (f) releasing the optical system from the casting mold; and
   (g) re-using the casting mold to produce a second optical system.

13. The method according to claim 1, wherein the first surface of the translucent carrier is completely wetted.

* * * * *